(12) United States Patent
Clauser et al.

(10) Patent No.: US 9,199,564 B2
(45) Date of Patent: Dec. 1, 2015

(54) SEAT ASSEMBLY HAVING A TRIM COVER ASSEMBLY

(71) Applicant: Lear Corporation, Southfield, MI (US)

(72) Inventors: James Clauser, Oakland Township, MI (US); William Paruszkiewicz, Clinton Township, MI (US); Meredith Gannes, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/465,168

(22) Filed: Aug. 21, 2014

(65) Prior Publication Data

US 2015/0165947 A1 Jun. 18, 2015

Related U.S. Application Data

(60) Provisional application No. 61/915,130, filed on Dec. 12, 2013.

(51) Int. Cl.
| | |
|---|---|
| *A47C 27/00* | (2006.01) |
| *A47C 31/00* | (2006.01) |
| *B60N 2/58* | (2006.01) |
| *B60N 2/68* | (2006.01) |
| *B68G 7/12* | (2006.01) |
| *A47C 31/02* | (2006.01) |
| *B60N 2/60* | (2006.01) |

(52) U.S. Cl.
CPC ............ *B60N 2/5825* (2013.01); *B60N 2/5833* (2013.01); *B60N 2/68* (2013.01); *A47C 31/023* (2013.01); *B60N 2/6027* (2013.01); *B68G 7/12* (2013.01)

(58) Field of Classification Search
CPC .. A47C 31/023; B60N 2/5825; B60N 2/6027; B68G 7/12

USPC .......... 297/452.6, 218.1, 218.2, 218.3, 218.5, 297/218.4, 228.12, 226; 5/406; D8/394, D8/395
See application file for complete search history.

(56) References Cited

U.S. PATENT DOCUMENTS

| | | | | |
|---|---|---|---|---|
| 3,630,572 | A | * | 12/1971 | Homier ...................... 297/452.6 |
| 3,853,352 | A | | 12/1974 | Ambrose |
| 4,317,591 | A | | 3/1982 | Ramsey |
| 5,342,569 | A | | 8/1994 | Murasaki |
| 5,518,292 | A | * | 5/1996 | Cozzani ..................... 297/218.5 |
| 5,722,723 | A | * | 3/1998 | Riley et al. ............... 297/228.13 |
| 6,568,761 | B2 | * | 5/2003 | Perske et al. ................ 297/452.6 |
| 7,287,305 | B2 | * | 10/2007 | Bednarski ........................ 24/297 |
| 7,506,939 | B2 | * | 3/2009 | Brockschneider et al. ........................ 297/452.6 |
| 8,528,984 | B2 | | 9/2013 | Galbreath et al. |
| 8,752,902 | B2 | * | 6/2014 | Labish ....................... 297/452.6 |
| 8,998,310 | B2 | * | 4/2015 | Lovasz et al. ................ 297/123 |

(Continued)

FOREIGN PATENT DOCUMENTS

| | | |
|---|---|---|
| DE | 3016644 A1 | 11/1981 |
| DE | 10120621 A1 | 11/2002 |

(Continued)

OTHER PUBLICATIONS

German Patent and Trademark Office, Office Action for corresponding German Patent Application No. 10 2014 223 955.9 mailed Oct. 8, 2015.

*Primary Examiner* — Chi Q Nguyen
(74) *Attorney, Agent, or Firm* — Brooks Kushman P.C.

(57) ABSTRACT

A seat assembly having a retention clip that may couple a trim cover assembly to a support structure. The trim cover assembly may be disposed proximate a cushion that may be supported by the support structure. The retention clip may extend through a slit in the cushion and may be pivotally coupled to the support structure.

20 Claims, 2 Drawing Sheets

(56) References Cited

U.S. PATENT DOCUMENTS

| | | |
|---|---|---|
| 2002/0074845 A1 | 6/2002 | Perske et al. |
| 2007/0257531 A1* | 11/2007 | Mashimo ................... 297/218.3 |
| 2009/0033131 A1* | 2/2009 | Clauser et al. ............. 297/218.4 |
| 2009/0064471 A1* | 3/2009 | Santin et al. ................ 24/581.11 |
| 2013/0313876 A1 | 11/2013 | Perrin |
| 2014/0068900 A1 | 3/2014 | Lovasz et al. |

FOREIGN PATENT DOCUMENTS

| | | |
|---|---|---|
| DE | 69631252 T2 | 11/2004 |
| DE | 202004017050 U1 | 1/2005 |
| DE | 202005008952 U1 | 8/2005 |
| DE | 69731722 T2 | 11/2005 |
| DE | 102004040333 A1 | 3/2006 |
| DE | 102005050409 A1 | 5/2007 |
| EP | 0162400 A1 | 11/1985 |
| GB | 1592435 A | 7/1981 |
| JP | H07231990 A | 9/1995 |
| JP | H08280956 A | 10/1996 |
| JP | H11276735 A1 | 10/1999 |
| JP | 2001190873 A | 7/2001 |
| JP | 2012176139 A | 9/2012 |
| WO | 2012153023 A2 | 11/2012 |

\* cited by examiner

SEAT ASSEMBLY HAVING A TRIM COVER ASSEMBLY

CROSS-REFERENCE TO RELATED APPLICATIONS

This application claims the benefit of U.S. provisional application Ser. No. 61/915,130 filed Dec. 12, 2013, the disclosure of which is hereby incorporated in its entirety by reference herein.

TECHNICAL FIELD

This patent application relates to a seat assembly having a trim cover assembly that may be secured to the seat assembly.

BACKGROUND

A holder that is held in a cushion material is disclosed in German Utility Model No. 20 2005 008 952 U1.

SUMMARY

In at least one embodiment, a seat assembly is provided. The seat assembly may include a support structure, a cushion, a trim cover assembly, and a retention clip. The cushion may be disposed proximate the support structure and may have a slit that extends through the cushion. The trim cover assembly may be disposed proximate the cushion. The trim cover assembly may have an engagement feature. The retention clip may couple the trim cover assembly to the support structure. The retention clip may have a first attachment portion, an intermediate portion, and a second attachment portion. The first attachment portion may be disposed proximate the cushion and the engagement feature. The intermediate portion may extend from the first attachment portion through the slit. The second attachment portion may extend from the intermediate portion and may be coupled to the support structure. The first attachment portion and the second attachment portion may pivot with respect to the intermediate portion.

In at least one embodiment, a seat assembly is provided. The seat assembly may include a support structure, a cushion, a trim cover assembly, and a retention clip. The cushion may be disposed proximate the support structure. The cushion may have a channel and a slit that may extend from the channel through the cushion. The trim cover assembly may be disposed proximate the cushion and may have an engagement feature. The retention clip may couple the trim cover assembly to the support structure. The retention clip may have a first attachment portion, an intermediate portion, and a second attachment portion. The first attachment portion may be disposed in the channel and may be fixedly positioned with respect to the engagement feature. The intermediate portion may extend from the first attachment portion through the slit. The second attachment portion may extend from the intermediate portion to the support structure and may pivot with respect to the support structure.

In at least one embodiment, a seat assembly is provided. The seat assembly may include a support structure, a cushion, a cushion actuator, a trim cover assembly, and a retention clip. The cushion may be disposed proximate the support structure. The cushion may have a slit that may extend through the cushion. The cushion actuator may be disposed proximate the cushion and may be configured to move the cushion from a first position to a second position. The trim cover assembly may be disposed proximate the cushion and may have an engagement feature. The retention clip may couple the trim cover assembly to the support structure. The retention clip may extend through the slit and may have a first attachment portion and a second attachment portion. The first attachment portion may be disposed proximate the engagement feature. The second attachment portion may receive the support structure and may pivot about the support structure when the cushion actuator moves the cushion between the first position and the second position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
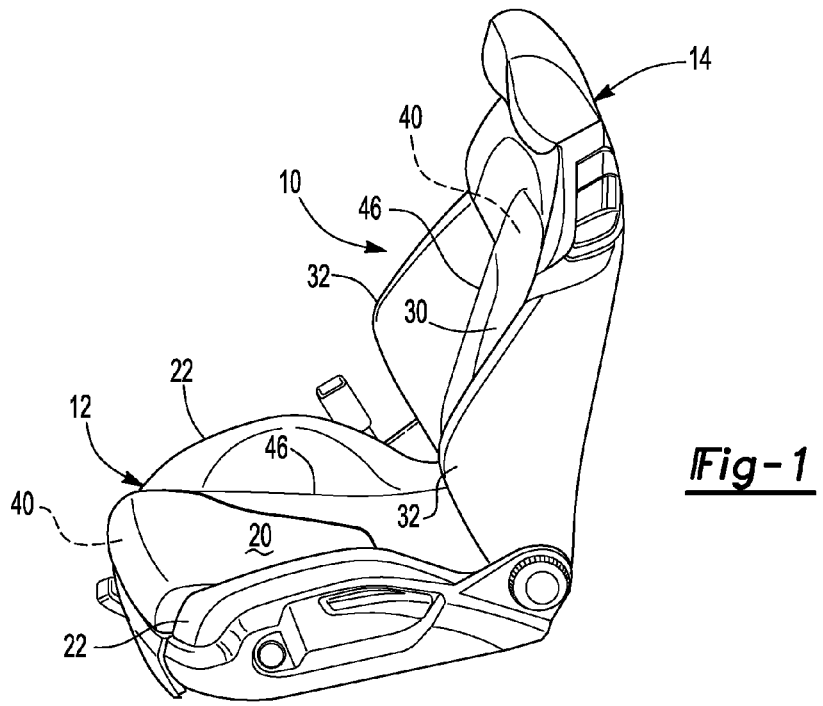
FIG. 1 is a perspective view of a seat assembly having a trim cover assembly.

Referring to FIG. 1, an exemplary seat assembly 10 is shown. The seat assembly 10 may be configured for use with a vehicle, such as a motor vehicle like a car or truck, aircraft, or marine vessel. In addition, the seat assembly 10 may also be provided for non-vehicular applications. The seat assembly 10 may include a seat bottom 12 and a seat back 14.

Figure 2:
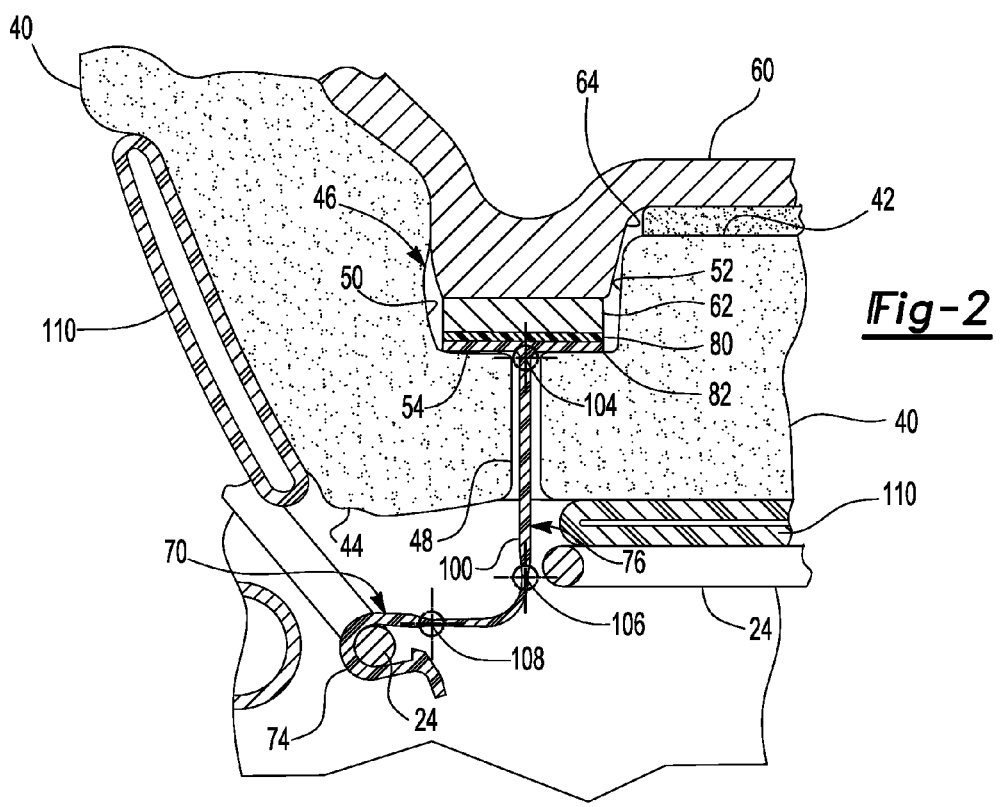
FIGS. 2 and 3 are section views of the seat assembly showing exemplary positions of a retention clip that may be configured to secure the trim cover assembly.

Referring to FIGS. 1 and 2, the seat bottom 12 may be configured to be mounted on a support surface, such as a floor pan of a vehicle. The seat bottom 12 may include a center seating region 20 and a plurality of side bolsters 22 that may be disposed proximate and may extend along opposite sides of the center seating region 20. As such, the side bolsters 22 may generally extend along opposing lateral sides of the seat bottom 12 and may extend away from the seat back 14, such as from the seat back 14 toward the front of the seat bottom 12. The seat bottom 12 may include a support structure 24, such as a seat frame, seat pan, and/or support wires that may support and facilitate mounting of components of the seat assembly 10.

The seat back 14 may be pivotally disposed on the seat bottom 12 and may include a head restraint assembly that may be disposed proximate a top of the seat back 14. The seat back 14 may include a center seating region 30 and a plurality of side bolsters 32 that may be disposed proximate and may extend along opposite sides of the center seating region 30. As such, the side bolsters 32 may generally extend along opposing lateral sides of the seat back 14 between the top and bottom of the seat back 14. The seat back 14 may also include a support structure 24, such as a seat frame, seat pan, and/or support wires that may support and facilitate mounting of components of the seat assembly 10. A common reference number is used to designate the support structure 24 for the seat bottom 12 and the seat back 14 in FIGS. 2 and 3 as these figures illustrate components and configurations that may be provided with either a seat bottom 12 or a seat back 14.

A cushion 40 may be disposed on the seat bottom 12 and/or the seat back 14. For instance, one or more cushions 40 may be provided with the seat bottom 12 and one or more cushions 40 may be provided with the seat back 14. Such a cushion or cushions 40 may be directly or indirectly supported by a corresponding support structure 24. The cushion 40 may be made of any suitable material, such as foam. As is best shown in FIG. 2, the cushion 40 may include a first surface 42 and a second surface 44. The first surface 42 may face toward a seat occupant. The second surface 44 may be disposed opposite the first surface 42 and may face toward and may be disposed proximate or disposed on the support structure 24. The cushion 40 may also include a channel 46 and a slit 48.

The channel 46 may be a recess, such as a trench or elongated groove that may be provided in the cushion 40. One or more channels 46 may be provided with a cushion 40 in various locations. For instance, a channel 46 may be provided where the contour of the seating surface changes, such as where the center seating region 20 of the seat bottom 12 meets a side bolster 22 and/or where the center seating region 30 of the seat back 14 meets a side bolster 32. The channel 46 may be at least partially defined by a plurality of surfaces. For instance, the channel 46 may be at least partially defined by a first channel side surface 50, a second channel side surface 52, and a bottom channel surface 54.

The first channel side surface 50 and the second channel side surface 52 may extend from the first surface 42 to the bottom channel surface 54. As such, the first channel side surface 50 and the second channel side surface 52 may extend toward the second surface 44 or the bottom of the cushion 40. The first channel side surface 50 may be partially or completely spaced apart from the second channel side surface 52.

The bottom channel surface 54 may extend between the first channel side surface 50 and the second channel side surface 52 or from the first channel side surface 50 to the second channel side surface 52. As such, the bottom channel surface 54 may be spaced apart from and may be disposed between the first surface 42 and the second surface 44.

The slit 48 may be configured as a through hole that may extend through the cushion 40. For example, a slit 48 may extend from the bottom channel surface 54 to the second surface 44 of the cushion 40. One or more slits 48 may be provided with a channel 46. Moreover, one or more slits 48 may be partially or completely spaced apart from each other to define separate slits in one or more embodiments. A slit 48 may have shorter length (that may be measured along the bottom channel surface 54 generally parallel to the first channel side surface 50 or the second channel surface 52) than the length of the channel 46 from which the slit 48 extends.

At least one trim cover assembly 60 may be provided with the seat assembly 10. The trim cover assembly 60 may be disposed over or upon the cushion 40 and may form or provide at least a portion of a visible exterior surface of the seat assembly 10 upon which a seat occupant may be disposed when in a seated position. The trim cover assembly 60 may include one or more trim panels that may be made of any suitable material, such as fabric, leather, vinyl, or combinations thereof. In at least one embodiment, the trim cover assembly 60 may have an envelope configuration in which trim panels of the trim cover assembly 60 are stitched together such that the trim cover assembly 60 has a single opening at one end into which the seat bottom 12 or the seat back 14 may be inserted. In such a configuration, direct access to features that secure the trim cover assembly 60 to the seat assembly 10 or support structure 24 or visibility of such features may be inhibited or blocked by the trim cover assembly 60.

The trim cover assembly 60 may also include at least one engagement feature 62. The engagement feature 62 may help secure the trim cover assembly 60 to a retention clip 70 to hold the trim cover assembly 60 in a desired position and to inhibit folding, puckering, or wrinkling of the trim cover assembly 60 that may result in an undesirable aesthetic appearance. The engagement feature 62 may be disposed proximate an interior surface 64 of the trim cover assembly 60 that may face toward and that may engage the cushion 40. The engagement feature 62 may have any suitable configuration, such as a male configuration, female configuration, or combinations thereof, or may include an adhesive. For example, the engagement feature 62 may be configured as a portion of a hook and loop fastener such as Velcro®. The engagement feature 62 may be provided in any suitable location. For example, the engagement feature 62 may be aligned with the channel 46 and/or one or more associated slits 48 and may be disposed proximate an end of one or more trim cover panels or proximate where one or more trim cover panels are stitched together. In addition, the engagement feature 62 may be partially or completely disposed in the channel 46 below the first surface 42 when the trim cover assembly 60 is installed. The engagement feature 62 may be coupled to the trim cover assembly 60 in any suitable manner, such as with stitching, one or more fasteners, and/or an adhesive.

Figure 3:
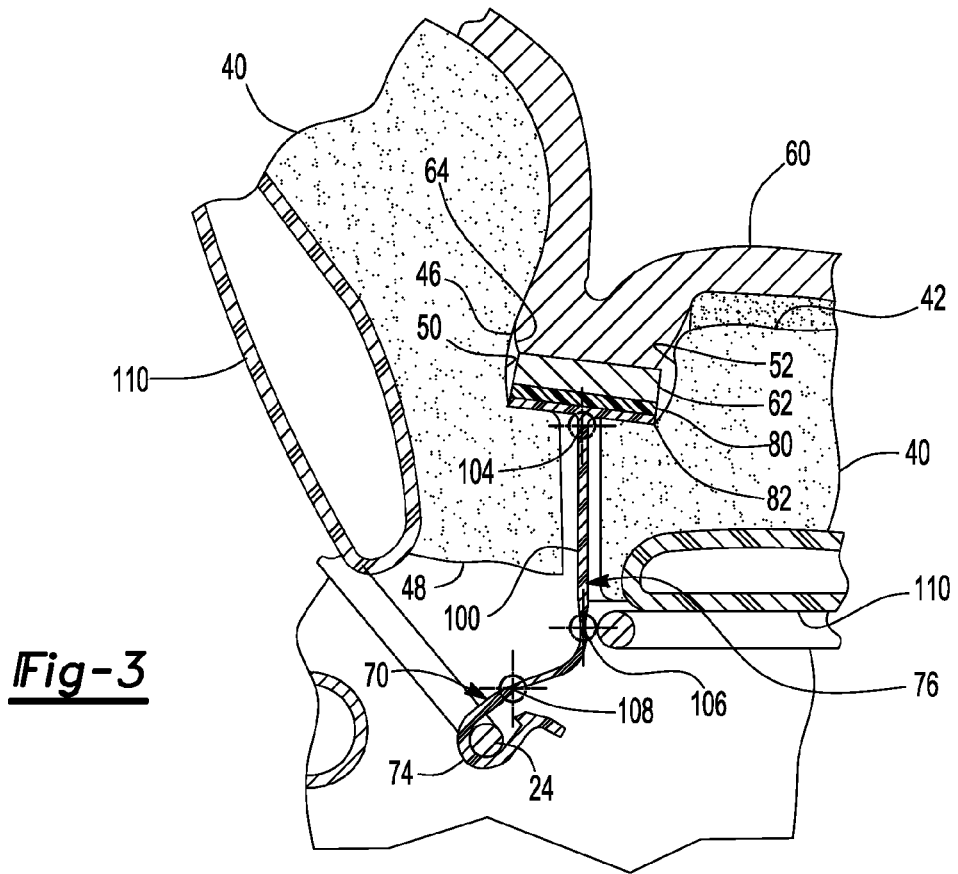
Figure 4:
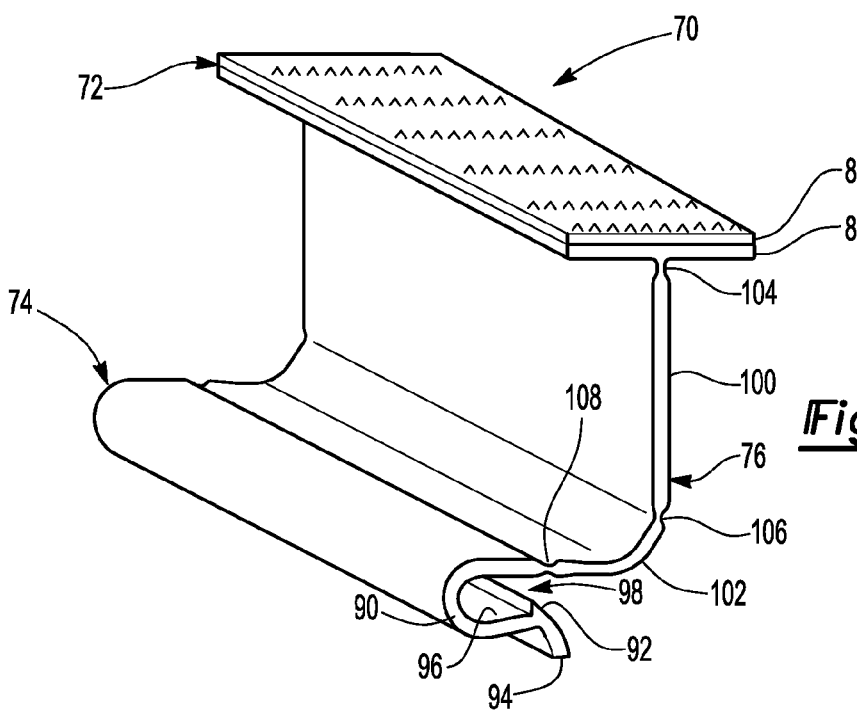
FIG. 4 is a perspective view of the retention clip.

Referring to FIGS. 2-4, the seat assembly 10 may include one or more retention clips 70. The retention clip 70 may be configured to help secure the trim cover assembly 60 to the support structure 24. For example, a retention clip 70 may extend through a slit 48 in the cushion 40 and may connect or couple the trim cover assembly 60 to the support structure 24. The retention clip 70 may be made of any suitable material, such as a polymeric material and may include a fabric or woven material. As is best shown in FIG. 4, the retention clip 70 may include a first attachment portion 72, a second attachment portion 74, and an intermediate portion 76.

The first attachment portion 72 may be coupled to the trim cover assembly 60. For example, the first attachment portion 72 may be partially or completely disposed in the channel 46 and may be configured to engage or be coupled to the trim cover assembly 60. In at least one embodiment, the first attachment portion 72 may include a fastener portion 80 and a platform 82.

The fastener portion 80 may facilitate coupling of the retention clip 70 to the trim cover assembly 60. As is best shown in FIGS. 2 and 3, the fastener portion 80 may be disposed proximate and may engage the engagement feature 62 on the trim cover assembly 60. As such, the fastener portion 80 and the first attachment portion 72 may be fixedly disposed with respect to the engagement feature 62. The fastener portion 80 may have any configuration that is compatible for mating, coupling, or attachment to the engagement feature 62. For example, the fastener portion 80 may be configured as a portion of a hook and loop fastener that may engage and/or mate with the engagement feature 62. The fastener portion 80 may be fixedly disposed on the platform 82 in any suitable manner, such as by extruding the platform 82 to the fastener portion 80 such that the platform 82 bonds to or is partially extruded around the fastener portion 80. Alternatively or in addition, the fastener portion 80 may be bonded or joined to the platform 82 with an adhesive or mechanical fastener in one or more embodiments.

The platform 82 may support the fastener portion 80. In at least one embodiment, the platform 82 may have a substantially flat or planar configuration. The platform 82 may be larger than the slit 48 to inhibit the fastener portion 80 and the platform 82 from passing through the slit 48. For example, the platform 82 may have a width that may extend between the first channel side surface 50 and the second channel side surface 52 and that may be greater than the width of the slit 48 in the same direction or in a direction that extends from the first channel side surface 50 to the second channel side surface 52. The platform 82 may also have a length that may be less than the length of a corresponding slit 48 to provide clearance to facilitate installation of the retention clip 70 through the slit 48. The platform 82 may be disposed proximate and may engage the first channel side surface 50, the second channel side surface 52, and/or the bottom channel surface 54 to help position and inhibit movement of the platform 82 out of the channel 46 or twisting of the platform 82 with respect to the channel 46. Moreover, the platform 82 may be completely disposed below the first surface 42 of the cushion 40 or may be completely disposed in the channel 46 in one or more embodiments to help improve seating comfort. The platform 82 may be generally rigid to inhibit folding or buckling of the platform 82, which would otherwise allow the platform 82 to pass through the slit 48.

The second attachment portion 74 may be coupled to the support structure 24 of the seat bottom 12 or the seat back 14. For example, the second attachment portion 74 may be disposed outside of the cushion 40 and the slit 48 and may be disposed proximate the second surface 44 of the cushion 40 or underneath or behind the cushion 40. In at least one embodiment, the second attachment portion 74 may be generally rigid to help maintain engagement of the second attachment portion 74 to the support structure 24, but may flex slightly to facilitate insertion of the support structure 24. In at least one embodiment, the second attachment portion 74 may include a hook portion 90, a retention barb 92, and a guide 94.

The hook portion 90 may help define a cavity 96 that may receive the support structure 24. In at least one embodiment, the hook portion 90 may extend more than 180° around the support structure 24 and may rotate or pivot about the support structure 24 as will be discussed in more detail below. The hook portion 90 may extend away from the intermediate portion 76 and then may curve or change its trajectory such that hook portion 90 extends away from the first attachment portion 72 and then back toward the intermediate portion 76. As such, the hook portion 90 may be curved away from first attachment portion 72. An opening 98 may be disposed adjacent to the hook portion 90 to facilitate installation. More specifically, the support structure 24 may pass through the opening 98 when the retention clip 70 is installed on the support structure 24. The opening 98 may be open in a direction that faces or extends toward the intermediate portion 76.

The retention barb 92 may be disposed proximate the opening 98. The retention barb 92 may narrow the opening 98 to help inhibit removal of the retention clip 70 from the support structure 24 after installation. For instance, the retention barb 92 may be disposed opposite and may generally extend away from the guide 94 such that the distance between the end of the retention barb 92 and a portion of the retention clip 70 that is disposed on an opposite side of the opening 98 from the retention barb 92 is narrower than the portion of the support structure 24 that is received in the opening 98. \As such, the second attachment portion 74 may flex such that the retention barb 92 moves and the opening 98 expands when the support structure 24 is inserted through the opening 98 and may return to the position shown in FIG. 2, 3 or 4 to help inhibit the support structure 24 from exiting the opening 98. The retention barb 92 may have a curved exterior surface that may extend toward the hook portion 90 to help guide the support structure 24 toward the opening 98 during installation.

The guide 94 may assist with assembly of the retention clip 70 to the support structure 24. For example, the guide 94 may be disposed at a distal end of the second attachment portion 74 and may help guide or route the retention clip 70 through the slit 48 in the cushion 40 and/or help route the retention clip 70 to a desired position proximate the support structure 24. In addition, the guide 94 may extend along a curve or arc to help guide the support structure 24 toward the opening 98.

Is also contemplated that the second attachment portion 74 may be configured to engage the support structure 24 in a different manner. For example, the second attachment portion 74 may be configured to be coupled to the support structure 24 with a different clip configuration, or a different fastener, such as a hog ring in one or more embodiments The intermediate portion 76 may extend from the first attachment portion 72 and the second attachment portion 74. In addition, the intermediate portion 76 may extend through the slit 48 in the cushion 40. The intermediate portion 76 may be configured to flex or pivot to help secure or maintain positioning of the trim cover assembly 60 when the cushion 40 is deformed or moved as will be discussed in more detail below. In at least one embodiment, the intermediate portion 76 may include a first segment 100 and a second segment 102.

The first segment 100 may extend from the platform 82 to the second segment 102. In addition, the first segment 100 may extend through the slit 48 in the cushion 40 as is best shown in FIGS. 2 and 3. The first segment 100 may be configured to flex or pivot with respect to the platform 82. For example, the first segment 100 may have a first living hinge 104 that may allow the first segment 100 to pivot with respect to the platform 82. The first living hinge 104 may be disposed proximate the platform 82 and the first segment 100 and may have a reduced cross-sectional thickness as compared to adjacent regions of the platform 82 and the first segment 100. In addition, the first living hinge 104 may be disposed in the slit 48.

A second living hinge 106 may be provided that may allow the first segment 100 to flex or pivot with respect to the second segment 102 or vice versa. The second living hinge 106 may be disposed between the first attachment portion 72 and the second attachment portion 74 and may be disposed outside of the cushion 40 and the slit 48. For instance, the second living hinge 106 may be disposed proximate or between the first segment 100 and the second segment 102 and may have a reduced cross-sectional thickness as compared to an adjacent region of the first segment 100.

The first segment 100 may be generally flat or planar between the first living hinge 104 and the second living hinge 106 in one or more embodiments. Alternatively, the first segment 100 may be configured as a flexible material, such as a woven fabric or film that may or may not have distinct or discrete living hinges.

The second segment 102 may extend from the first segment 100 to the second attachment portion 74. In at least one embodiment, the second segment 102 may have a reduced cross-sectional thickness as compared to the first segment 100 and/or the second attachment portion 74.

A third living hinge 108 may be disposed between the intermediate portion 76 and the second attachment portion 74. For example, the third living hinge 108 may be provided where the second segment 102 meets the second attachment portion 74. The third living hinge 108 may permit the second attachment portion 74 to pivot with respect to the intermediate portion 76 and the second segment 102. In addition, the third living hinge 108 may be disposed outside of the cushion 40 and the slit 48. Alternatively, the second segment 102 may be configured to flex over some or all of its length. The second segment 102 may be curved or may have a J shape between opposing ends or between the second and third living hinges 106, 108 in one or more embodiments. Alternatively, the second segment 102 may be configured as a flexible material, such as a woven fabric or film that may or may not have distinct or discrete living hinges.

Referring to FIGS. 2 and 3, flexing or pivoting of an installed retention clip 70 is illustrated. The flexibility of the retention clip 70 may help continuously secure the trim cover assembly 60 to the seat assembly 10 when the position of the cushion 40 underneath the trim cover assembly 60 is altered. For example, the position of the cushion 40 may be altered by load forces exerted upon the seat assembly 10, such as by a seat occupant, and/or from within the seat assembly 10. For example, the seat assembly 10 may include one or more cushion actuators 110 that may be actuated to adjust the position of one or more cushions 40. The cushion actuators 110 may be configured as inflatable bladders; however, it is contemplated that other types of actuators, such as a mechanical or electromechanical actuator may be employed. A cushion actuator 110 disposed underneath a side bolster 22, 32 may be actuated or inflated to move the side bolster 22, 32 in a predetermined manner, such as inboard or toward the center of the seat assembly 10 or toward the body or torso of a seat occupant. The cushion actuator 110 may also be actuated or deflated to move a side bolster 22, 32 outboard or away from the body or torso the seat occupant. A cushion actuator 110 that is disposed proximate the center of the seat back 14 may be actuated to provide a desired level of lumbar support.

In FIG. 2, the cushion actuators 110 are shown in an initial position in which the cushion actuators 110 may be deflated and the cushion 40 is shown in a first position. The retention clip 70 is illustrated in an exemplary nominal position. In the nominal position, the retention clip 70 may be installed on the seat assembly 10 such that the engagement feature 62 of the trim cover assembly 60 may be coupled to the fastener portion 80 of the retention clip 70 and the second attachment portion 74 of the retention clip 70 may be coupled to the support structure 24. In addition, the first segment 100 may be disposed substantially perpendicular to the platform 82, the second segment 102 may be disposed substantially perpendicular to the first segment 100, and the opening of the second attachment portion 74 may generally face inboard or to the right from the perspective shown when the retention clip 70 is in the nominal position.

In FIG. 3, the cushion actuators 110 are shown in an adjusted position in which the cushion actuators 110 may be inflated, which may move the cushion 40 to a second position. The retention clip 70 is illustrated in a pivoted position. In the pivoted position, the retention clip 70 remains installed on the seat assembly 10, but may move, pivot, or flex in response to operation of the cushion actuators 110 and/or load forces exerted on the cushion 40. For example, the retention clip 70 may move such that that the platform 82 may pivot about the first living hinge 104 with respect to the first segment 100, the second attachment portion 74 may rotate or pivot about the support structure 24 or with respect to the portion of the support structure 24 that may be received by the hook portion 90, and the intermediate portion 76 may pivot with respect to the first attachment portion 72 and/or the second attachment portion 74, respectively, such as by pivoting about the second and/or third living hinges 106, 108. As such, the retention clip 70 may accommodate movement of the cushion 40 while retaining the trim cover assembly 60 in a manner that does not degrade seating comfort or result in the retention clip 70 protruding into the body of a seat occupant.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a support structure;
    a cushion that is disposed proximate the support structure and that has a slit that extends through the cushion;
    a trim cover assembly that is disposed proximate the cushion, wherein the trim cover assembly has an engagement feature; and
    a retention clip that couples the trim cover assembly to the support structure, the retention clip including:
        a first attachment portion that is disposed proximate the cushion and the engagement feature,
        an intermediate portion that extends from the first attachment portion through the slit, and
        a second attachment portion that extends from the intermediate portion and is coupled to the support structure;
    wherein the first attachment portion and the second attachment portion pivot with respect to the intermediate portion.

2. The seat assembly of claim 1 wherein the engagement feature is disposed proximate an interior surface of the trim cover assembly.

3. The seat assembly of claim 1 further comprising a first living hinge disposed between the first attachment portion and the intermediate portion, wherein the first living hinge permits the intermediate portion to pivot with respect to the first attachment portion.

4. The seat assembly of claim 3 wherein the first living hinge is disposed in the slit.

5. The seat assembly of claim 3 wherein the intermediate portion has a second living hinge that is disposed between the first attachment portion and the second attachment portion.

6. The seat assembly of claim 5 wherein the second living hinge is disposed outside of the cushion.

7. The seat assembly of claim 5 wherein the intermediate portion has a first segment that extends from the first attachment portion and a second segment that extends from the first segment to the second attachment portion, wherein the second living hinge is disposed between the first segment and the second segment and permits the second segment to pivot with respect to the first segment.

8. The seat assembly of claim 5 further comprising a third living hinge disposed between the intermediate portion and the second attachment portion, wherein the third living hinge permits the second attachment portion to pivot with respect to the intermediate portion.

9. The seat assembly of claim 8 wherein the third living hinge is disposed outside of the cushion.

10. A seat assembly comprising:
    a support structure;
    a cushion that is disposed proximate the support structure, the cushion having a channel that has a bottom channel surface and a slit that extends from the channel through the cushion;
    a trim cover assembly that is disposed proximate the cushion, wherein the trim cover assembly has an engagement feature; and
    a retention clip that couples the trim cover assembly to the support structure, the retention clip including:
        a first attachment portion that is disposed in the channel and is fixedly positioned with respect to the engagement feature, wherein the first attachment portion has a platform that is disposed proximate the bottom channel surface and a fastener portion that is disposed proximate the platform and is coupled to the engagement feature of the trim cover assembly, an intermediate portion that extends from the first attachment portion through the slit, and a second attachment portion that extends from the intermediate portion to the support structure, wherein the second attachment portion pivots with respect to the support structure.

11. The seat assembly of claim 10 wherein the cushion further comprises a first surface and a second surface disposed opposite the first surface, and wherein the channel extends from the first surface toward the second surface.

12. The seat assembly of claim 11 wherein the slit extends from the channel to the second surface.

13. The seat assembly of claim 10 wherein the first attachment portion and the second attachment portion pivot with respect to the intermediate portion.

14. The seat assembly of claim 10 wherein the platform, the fastener portion, and the engagement feature are disposed in the channel.

15. The seat assembly of claim 10 wherein the second attachment portion has a hook portion that defines a cavity that receives the support structure.

16. The seat assembly of claim 15 wherein the second attachment portion has an opening through which the support structure passes to enter the cavity and a retention barb that extends into the opening to inhibit removal of the support structure from the cavity.

17. The seat assembly of claim 16 wherein the second attachment portion has a guide that is disposed opposite the retention barb, wherein the retention barb and the guide extend along an arc.

18. A seat assembly comprising:
a support structure;
a cushion that is disposed proximate the support structure, the cushion having a slit that extends through the cushion;
a cushion actuator that is disposed proximate the cushion and configured to move the cushion from a first position to a second position;
a trim cover assembly that is disposed proximate the cushion, wherein the trim cover assembly has an engagement feature; and
a retention clip that extends through the slit and couples the trim cover assembly to the support structure, the retention clip including:
a first attachment portion that is disposed proximate the engagement feature, and
a second attachment portion that receives the support structure, wherein the second attachment portion pivots about the support structure when the cushion actuator moves the cushion between the first position and the second position.

19. The seat assembly of claim 18 wherein the retention clip includes an intermediate portion that extends between the first attachment portion and the second attachment portion, wherein the first attachment portion pivots with respect to the intermediate portion when the cushion actuator moves the cushion from the first position to the second position.

20. The seat assembly of claim 18 wherein the retention clip includes an intermediate portion that extends between the first attachment portion and the second attachment portion, wherein the second attachment portion pivots with respect to the intermediate portion when the cushion actuator moves the cushion from the first position to the second position.

* * * * *